US010291452B2

(12) United States Patent
Lee et al.

(10) Patent No.: US 10,291,452 B2
(45) Date of Patent: May 14, 2019

(54) METHOD FOR PROCESSING IN-BAND MULTIPLEXING USING FCP-OFDM SCHEME, AND DEVICE THEREFOR

(71) Applicant: LG ELECTRONICS INC., Seoul (KR)

(72) Inventors: Sangrim Lee, Seoul (KR); Hyunsoo Ko, Seoul (KR); Jaehoon Chung, Seoul (KR); Kwangseok Noh, Seoul (KR); Dongkyu Kim, Seoul (KR); Hojae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1 day.

(21) Appl. No.: 15/563,180

(22) PCT Filed: Jan. 21, 2016

(86) PCT No.: PCT/KR2016/000649

§ 371 (c)(1),
(2) Date: Sep. 29, 2017

(87) PCT Pub. No.: WO2016/159502

PCT Pub. Date: Oct. 6, 2016

(65) Prior Publication Data

US 2018/0091345 A1 Mar. 29, 2018

Related U.S. Application Data

(60) Provisional application No. 62/251,697, filed on Nov. 6, 2015, provisional application No. 62/141,857, filed on Apr. 2, 2015.

(51) Int. Cl.

*H04L 27/26* (2006.01)
*H04J 11/00* (2006.01)
*H04L 5/00* (2006.01)

(52) U.S. Cl.

CPC .......... *H04L 27/2605* (2013.01); *H04J 11/00* (2013.01); *H04L 5/001* (2013.01);

(Continued)

(58) Field of Classification Search

CPC ..... H04L 27/2605; H04L 27/26; H04L 5/001; H04L 27/2626; H04L 27/264; H04J 11/00

See application file for complete search history.

(56) References Cited

U.S. PATENT DOCUMENTS

2006/0087961 A1* 4/2006 Chang ................ H04L 27/2607 370/203
2007/0253496 A1* 11/2007 Giannakis ............ H04L 1/0041 375/260

(Continued)

FOREIGN PATENT DOCUMENTS

KR 10-2011-0099231 A 9/2011
KR 10-2011-0108259 A 10/2011
WO 2011/062444 A2 5/2011

OTHER PUBLICATIONS

Muquet, et al.: "Cyclic Prefixing or Zero Padding for Wireless Multicarrier Transmissions?", IEEE Transactions on Communications, vol. 50, No. 12, Dec. 2002, pp. 2136-2148.

*Primary Examiner* — Syed Haider
(74) *Attorney, Agent, or Firm* — Dentons US LLP

(57) ABSTRACT

A method for a base station processing in-band multiplexing using an FCP-OFDM scheme may comprise the steps of: transmitting, to a terminal, information on the length of zero padding (ZP) for a receiving side and the length of ZP for a transmitting side in a band for a first service among one or more services provided in one carrier; and on the basis of the information on the length of ZP for a receiving side and the length of ZP for a transmitting side, processing a signal of the first service in the transmitting end or receiving end of the base station.

18 Claims, 9 Drawing Sheets

(52) U.S. Cl.
CPC ............ *H04L 27/26* (2013.01); *H04L 27/264* (2013.01); *H04L 27/2626* (2013.01)

(56) References Cited

U.S. PATENT DOCUMENTS

| | | | | |
|---|---|---|---|---|
| 2011/0228868 | A1 | 9/2011 | Hua et al. | |
| 2015/0078476 | A1* | 3/2015 | Myung | H04L 27/2605 375/295 |
| 2015/0372843 | A1* | 12/2015 | Bala | H04L 25/03834 375/295 |

* cited by examiner (a) Structural diagram of a transmitting end (b) Structural diagram of a receiving end (a) Structural diagram of a transmitting end (b) Structural diagram of a receiving end

METHOD FOR PROCESSING IN-BAND MULTIPLEXING USING FCP-OFDM SCHEME, AND DEVICE THEREFOR

This application is the National Phase of PCT International Application No. PCT/KR2016/000649, filed on Jan. 21, 2016, which claims priorities under 35 U.S.C. 119(e) to U.S. Provisional Application No. 62/251,697, filed on Nov. 6, 2015, and 62/141,857, filed on Apr. 2, 2015, which are hereby incorporated by reference herein in their entirety.

TECHNICAL FIELD

The present invention relates to a wireless communication system, and more particularly, to a method of processing in-band multiplexing using FCP-OFDM scheme and apparatus therefor.

BACKGROUND ART

In the time of 5G to arrive in the future, it is expected that wireless application services more diverse than now will be demanded. For example, there is a service that provides a higher transmission rate using more frequency resources in an existing wideband service. This can provide hologram and real-time UHD high-quality services. In addition, a mission critical service requiring a low latency is categorized into a single service. To this, an emergency service requiring an extremely low latency or a service such as tactile internet, V2X and the like may pertain. Finally, a massive machine communication can be considered. It is expected that a new system will be necessary to support user equipments extremely more than the number of the current user equipments. For example, there is a sensor network.

It is apparent that it is difficult to provide the aforementioned service using a technology of CP-OFDM (cyclic prefix orthogonal frequency division multiplexing) that is the basis of a current LTE system. Particularly, in case of a low-latency communication, it is difficult to meet the requirement of 1 ms. Therefore, it is necessary to design a new system. Among such new schemes, a new waveform is being magnified as a most fundamental basis. There exist various schemes regarded as new waveforms. Various waveforms such as FBMC, GFDM, and UF-OFDM are discussed as waveforms appropriate for the 5G service.

DISCLOSURE OF THE INVENTION

Technical Tasks

One technical task achieved by the present invention is to provide a method for a base station to process in-band multiplexing using FCP-OFDM scheme.

Another technical task achieved by the present invention is to provide a method for a user equipment to process in-band multiplexing using FCP-OFDM scheme.

Further technical task achieved by the present invention is to provide a base station for processing in-band multiplexing using FCP-OFDM scheme.

Another further technical task achieved by the present invention is to provide a user equipment for processing in-band multiplexing using FCP-OFDM scheme.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of processing an in-band multiplexing using an FCP-OFDM (Filtered Cyclic Prefix Orthogonal Frequency Division Multiplexing) scheme by a base station, including transmitting, information regarding a zero padding (ZP) length for a receiving side and a ZP length for a transmitting side on a band for a first service among one or more services provided on a single carrier, to a user equipment and processing a signal of the first service in a transmitting end or receiving end of the base station based on the information regarding the ZP length for the receiving side and the ZP length for the transmitting side.

The ZP length for the receiving side may correspond to a length resulting from subtracting 1 from a filter length of a receiving end of the receiving side. The ZP length for the transmitting side may correspond to a length resulting from subtracting 1 from a filter length of a transmitting end of the transmitting side.

The method may further include transmitting, information regarding the zero padding (ZP) length for the receiving side and the ZP length for the transmitting side on a band for a second service among the one or more services provided on the single carrier, to the user equipment and processing a signal of the second service in the transmitting or receiving end of the base station based on the information regarding the ZP length for the receiving side and the ZP length for the transmitting side. Here, the band for the first service and the band for the second service may have different subcarrier sizes, respectively.

In another technical aspect of the present invention, provided herein is a method of processing an in-band multiplexing using an FCP-OFDM (Filtered Cyclic Prefix Orthogonal Frequency Division Multiplexing) scheme by a user equipment, including receiving, information regarding a zero padding (ZP) length for a receiving side and a ZP length for a transmitting side on a band for a first service among one or more services provided on a single carrier, from a base station and processing a signal of the first service in a transmitting or receiving end of the user equipment based on the information on the ZP length for the receiving side and the ZP length for the transmitting side.

The ZP length for the receiving side may correspond to a length resulting from subtracting 1 from a filter length of a receiving end of the receiving side. The ZP length for the transmitting side may correspond to a length resulting from subtracting 1 from a filter length of a transmitting end of the transmitting side.

The method may further include receiving, information regarding the zero padding (ZP) length for the receiving side and the ZP length for the transmitting side on a band for a second service among the one or more services provided on the single carrier, from the base station and processing a signal of the second service in the transmitting or receiving end of the user equipment based on the information on the ZP length for the receiving side and the ZP length for the transmitting side. Here, the band for the first service and the band for the second service may have different subcarrier sizes, respectively.

In further technical aspect of the present invention, provided herein is a base station in processing an in-band multiplexing using an FCP-OFDM (Filtered Cyclic Prefix Orthogonal Frequency Division Multiplexing) scheme, including a transmitter configured to transmit, information regarding a zero padding (ZP) length for a receiving side and a ZP length for a transmitting side on a band for a first service among one or more services provided on a single carrier, to a user equipment and a processor configured to process a signal of the first service in a transmitting or receiving end of the base station based on the information on the ZP length for the receiving side and the ZP length for the transmitting side.

In another further technical aspect of the present invention, provided herein is a user equipment in processing an in-band multiplexing using an FCP-OFDM (Filtered Cyclic Prefix Orthogonal Frequency Division Multiplexing) scheme, including a receiver configured to receive information on a zero padding (ZP) length for a receiving side and a ZP length for a transmitting side on a band for a first service among one or more services provided on a single carrier from a base station and a processor configured to process a signal of the first service in a transmitting or receiving end of the user equipment based on the information on the ZP length for the receiving side and the ZP length for the transmitting side.

Advantageous Effects

When different bands configured in different subcarrier sizes are multiplexed on a single carrier, a size of an interference signal due to orthogonality absence can be effectively eliminated through FCP-OFDM supportive of in-band multiplexing.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

Figure 1:
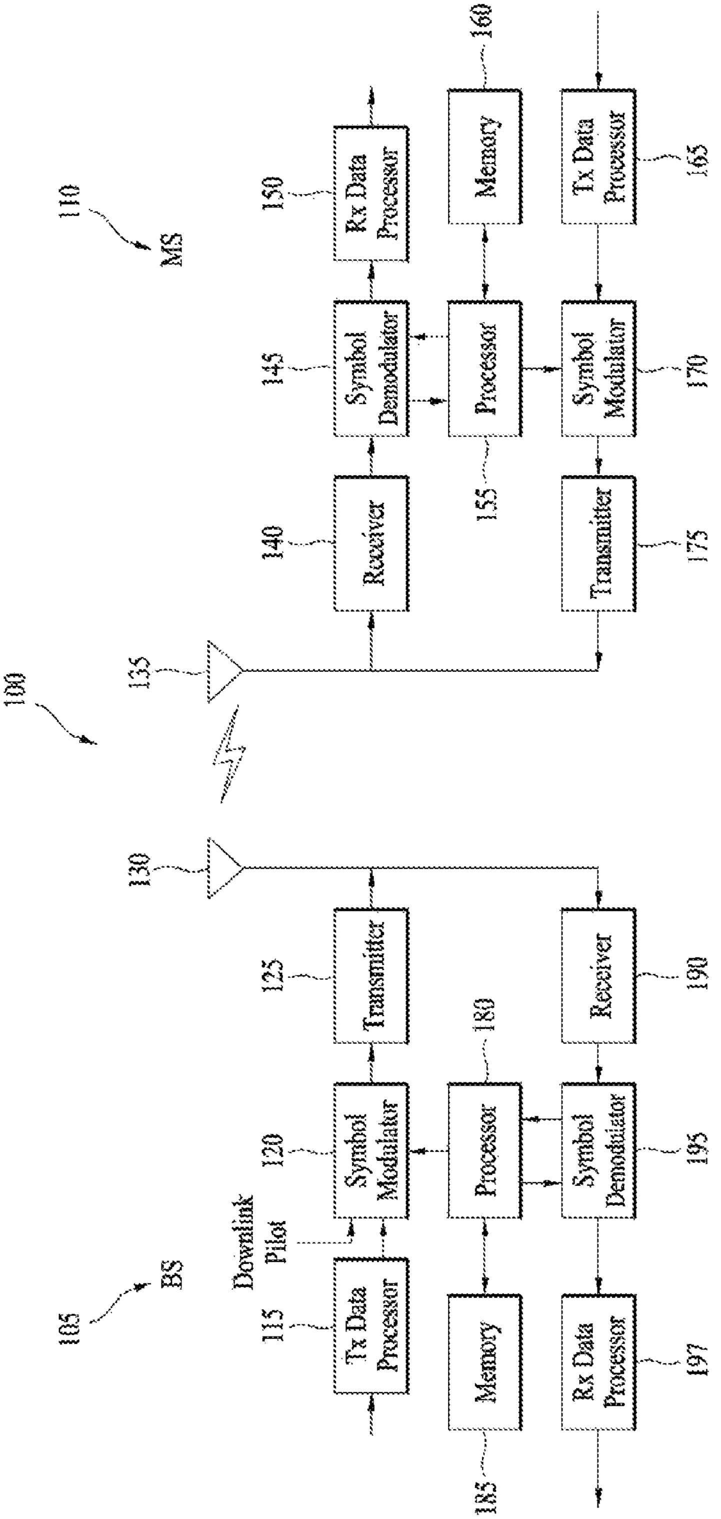
FIG. 1 is a block diagram showing configurations of a base station 105 and a user equipment 110 in a wireless communication system 100.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE employs OFDMA in DL and SC-FDMA in UL. And, LTE-A (LTE-Advanced) is an evolved version of 3GPP LTE.

Moreover, in the following description, specific terminologies are provided to help the understanding of the present invention. And, the use of the specific terminology can be modified into another form within the scope of the technical idea of the present invention.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

UF-OFDM (universal filtered-OFDM), which is a new waveform mentioned above, means a new waveform of applying a filter by a bundle unit of subcarriers without using CP unlike the existing CP-OFDM (cyclic prefix based OFDM).

Figure 2:
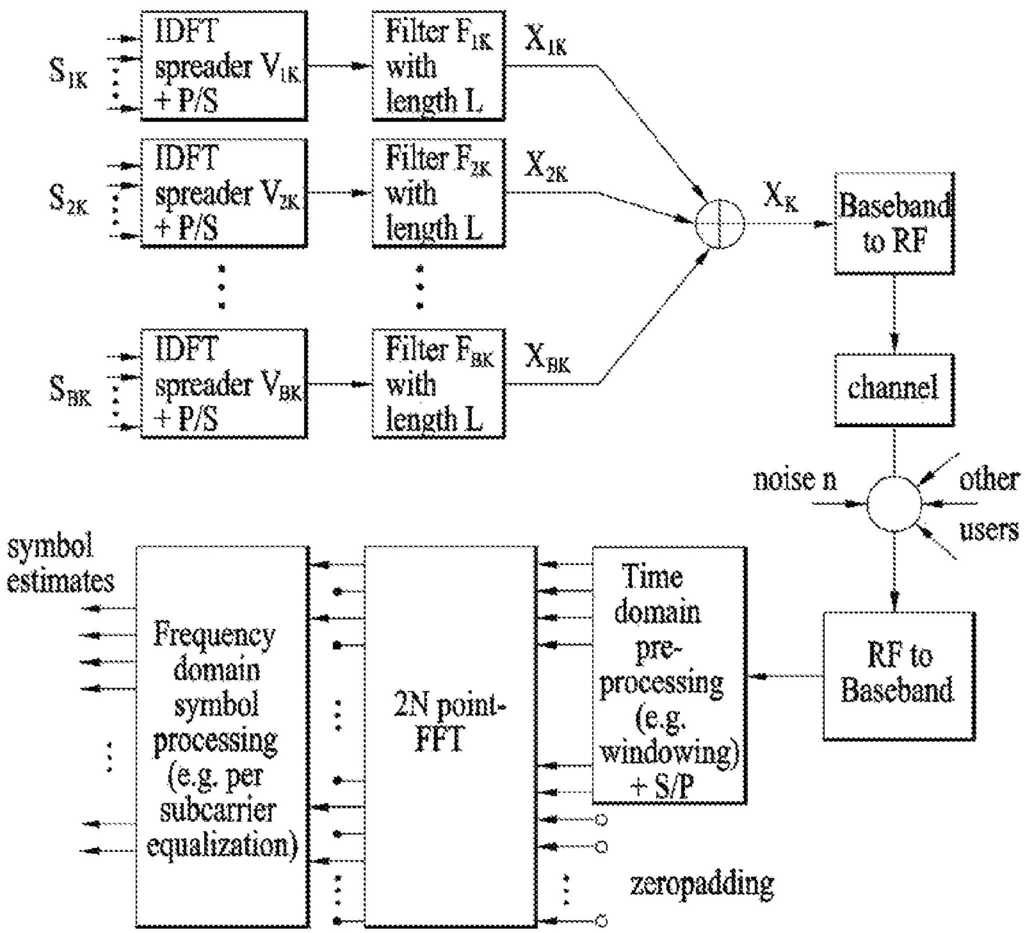
FIG. 2 is a diagram showing a transceiving end of UF-OFDM.

FIG. 2 is a diagram showing a transceiving end of UF-OFDM.

Unlike the existing OFDM, as shown in FIG. 2, there is a difference in that a filter is applied by a bundle unit of several subcarriers in a transmitting end. Thus, by applying a filter by a sub-band unit, it is able to considerably reduce influence of a signal affecting another adjacent band in comparison with the existing OFDM. Such a property has a great gain in aspect of utilization of a fragmented spectrum in a current frequency resource exhausted situation and serves as a foundation for the future communication technology.

Figure 3:
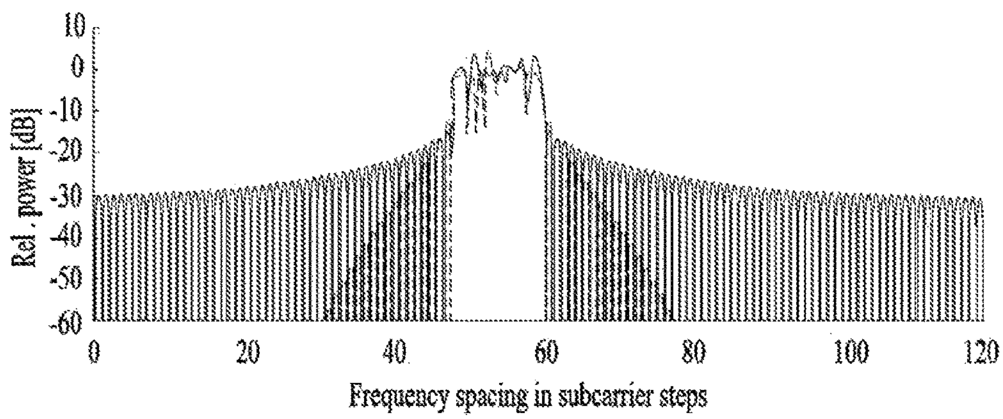
FIG. 3 is a diagram comparing power spectrums in a real frequency domain between an existing OFDM and a filter applied UF-OFDM.

FIG. 3 is a diagram comparing power spectrums in a real frequency domain between an existing OFDM and a filter applied UF-OFDM.

Referring to FIG. 3, it is observed that a power of a signal affecting another bad of an existing OFDM is lowered slowly. And, it is also observed that the power is lowered fast in case of UF-OFDM. Based on such a property, it is regarded as one candidate of a new waveform. In order to obtain a gain in aspect of the above-specified out-of-band emission (OOBE), the UF-OFDM scheme generates an overhead that should be detected using a size twice greater than an FFT size of the existing OFDM. The reason for this is described as follows. When a filter is applied, a length of total symbols increases in general. As a result, in order to perfectly detect a transmitted signal by a receiver, FFT in 2N size should be performed after zero-padding. Hence, although leakage of a signal to another band can be advantageously reduced, it is a problem that the FFT in size twice greater than the existing CP-OFDM should be used. If such a receiver is a user equipment, it may work as a heavy overhead.

FCP-OFDM means a new waveform of applying a filter by a bundle unit of subcarriers using an adaptive CP and filter. This method equalizes an FFT size of a receiving end to that of CP-OFDM in comparison with UF-OFDM.

Figure 4:
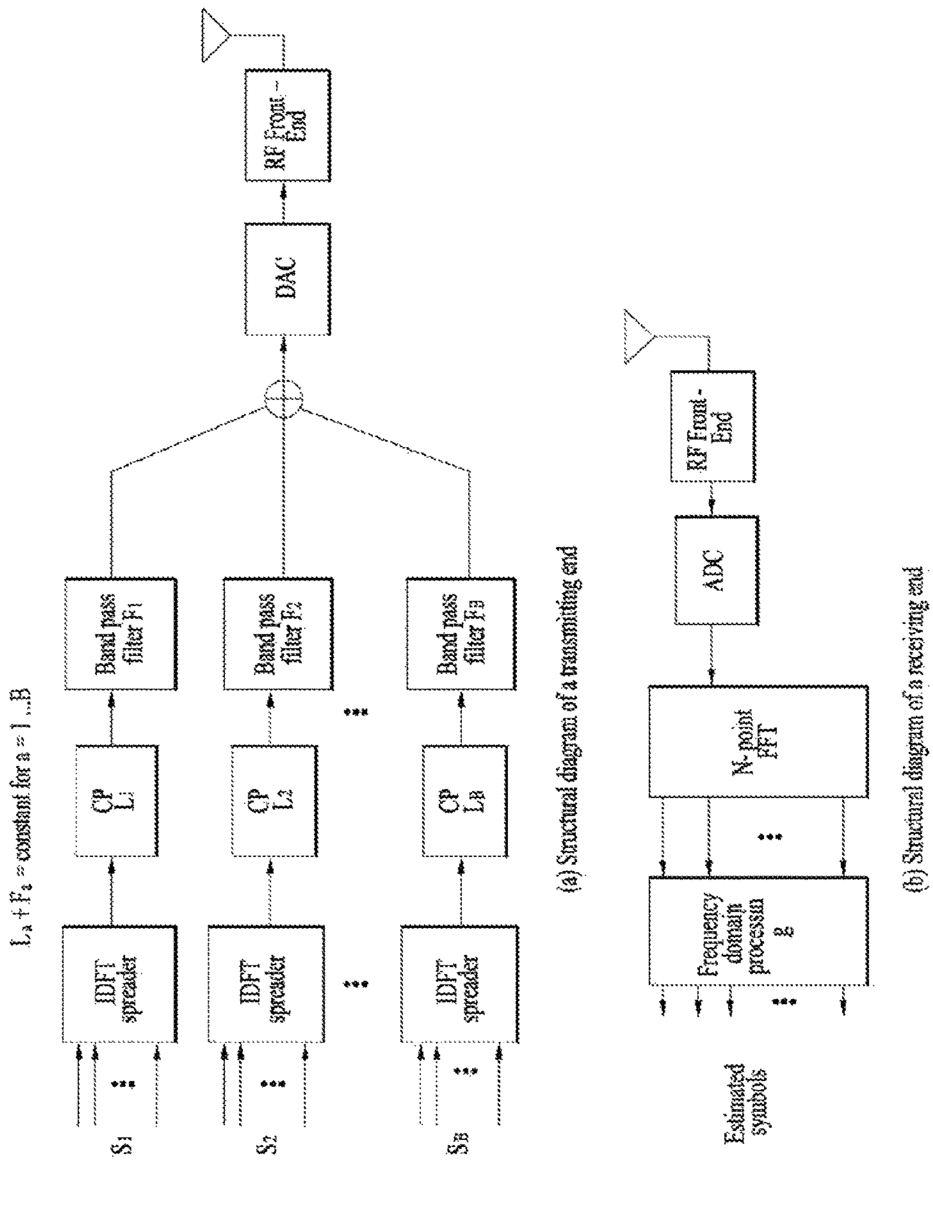
FIG. 4 is a diagram showing a transmitting end and a receiving end of FCP-OFDM.

FIG. 4 is a diagram showing a transmitting end and a receiving end of FCP-OFDM.

Unlike the existing OFDM, as shown in FIG. 4, there is a difference in applying a filter by a bundle unit of several subcarriers in a transmitting end. Thus, by applying a filter by a sub-band unit, it is able to considerably reduce influence of a signal affecting another adjacent band in comparison with the existing OFDM. Such a property has a great gain in aspect of utilization of a fragmented spectrum in a current frequency resource exhausted situation and serves as a foundation for the future communication technology.

Figure 5:
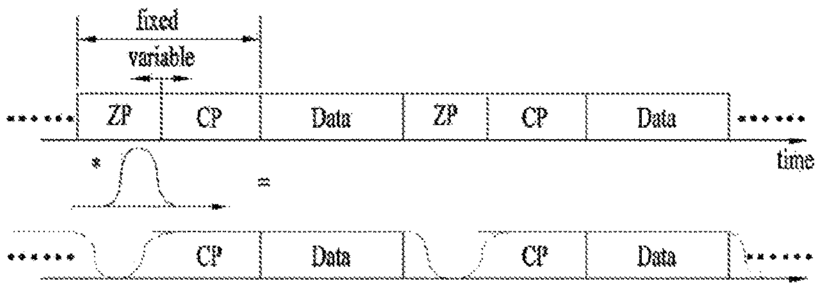
FIG. 5 is a diagram re-diagrammatizing a process for generating a signal actually coming out through the transmitting end shown in FIG. 4.

FIG. 5 is a diagram re-diagrammatizing a process for generating a signal actually coming out through the transmitting end shown in FIG. 4.

Referring to FIG. 5, while maintaining a sum of Zero Padding (ZP) length and CP length, by setting the length of the ZP to have a length resulting from subtracting 1 from a length of a filter used by a transmitting end, it is able to bring a property of maintaining N-point FFT in a receiving end.

Figure 6:
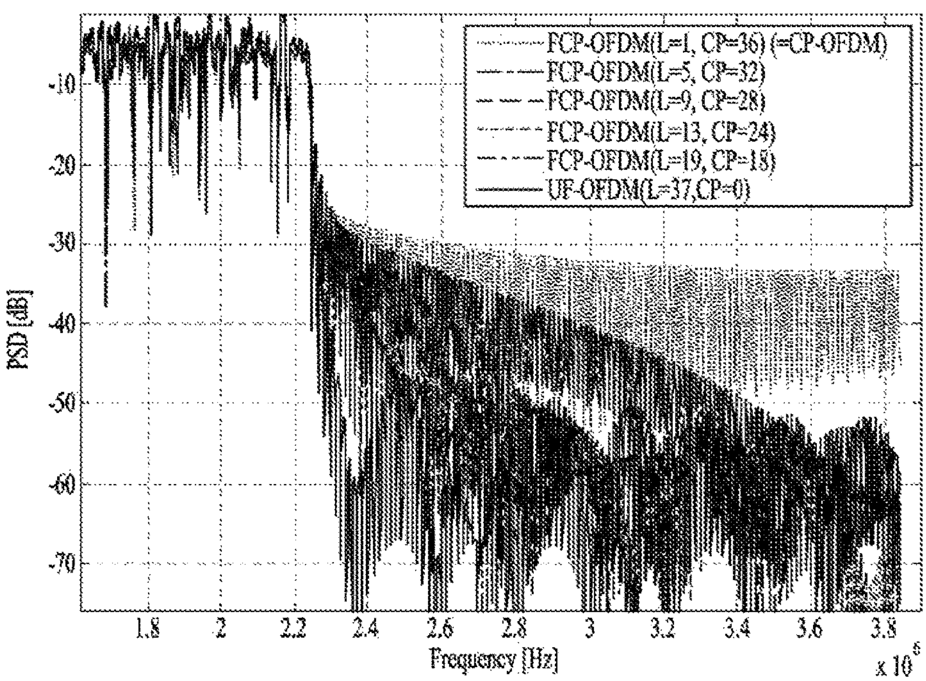
FIG. 6 is a diagram comparing power spectrums in a real frequency domain between an existing OFDM and a filter applied FCP-OFDM.

FIG. 6 is a diagram comparing power spectrums in a real frequency domain between an existing OFDM and a filter applied FCP-OFDM (filtered cyclic prefix orthogonal frequency division multiplexing).

As shown in FIG. 6, it is observed that a power of a signal affecting another bad of an existing OFDM is lowered slowly. And, it is also observed that the power is lowered fast in case of FCP-OFDM. Based on such a property, it is regarded as one candidate of a new waveform. As a filter for reducing out-of-emission radiation in FCP-OFDM, a filter shown in FIG. 7 is applied in general.

Figure 7:
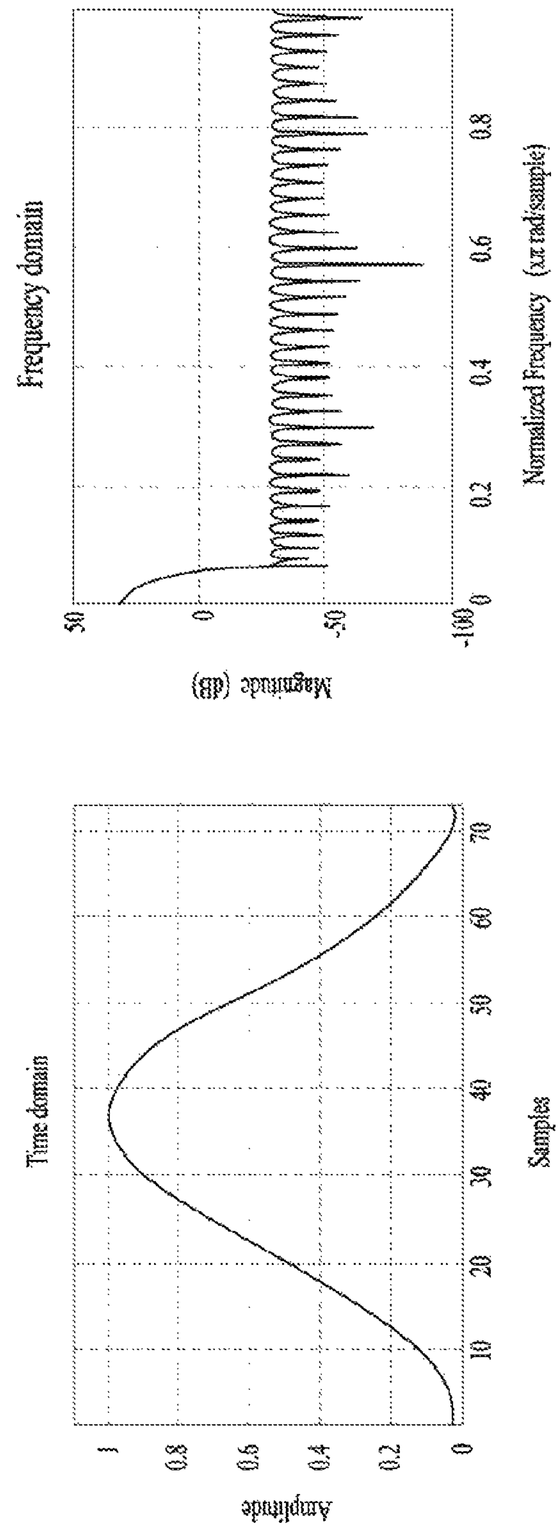
FIG. 7 is a diagram showing an example (Dolph-Chebyshev filter) of a filter for reducing out-of-emission radiation) in FCP-OFDM.

FIG. 7 is a diagram showing an example (Dolph-Chebyshev filter) of a filter for reducing out-of-emission radiation) in FCP-OFDM.

By applying a filter shown in FIG. 7, the out-of-band radiation of FCP-OFDM shown in FIG. 6 can be reduced. Through this new waveform, various services using the fragmented spectrum are enabled. For example, a machine type communication, a low latency service and the like can be provided. Moreover, it can be regarded as one waveform that meets heterogeneous requirements that will approach in the future. For example, IoT services such as NB-LTE (narrow-band long-term evolution), NB-CIoT (narrowband cellular IoT) and the like currently consider the following service scenario.

Figure 8:
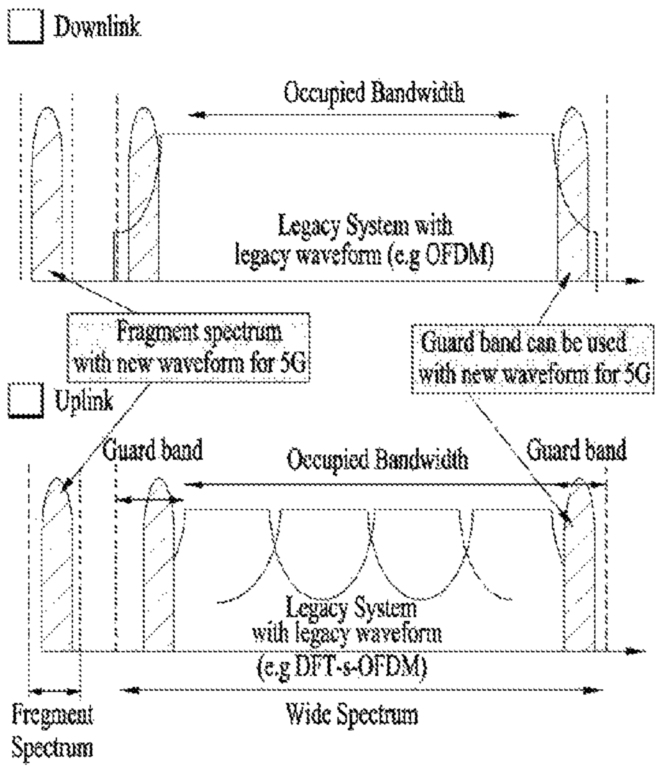
FIG. 8 is a diagram to describe a scenario of providing a new service using a new waveform for a guard band of an existing LTE band and an operation performed according to a stand-alone scheme of a new waveform by receiving allocation of a new fragmented spectrum.

FIG. 8 is a diagram to describe a scenario of providing a new service using a new waveform for a guard band of an existing LTE band and an operation performed according to a stand-alone scheme of a new waveform by receiving allocation of a new fragmented spectrum.

Referring to FIG. 8, it is proposed to use a new waveform for 5G in downlink/uplink on a guard band of an existing LTE band or operate by a sand-alone scheme of a new waveform by receiving allocation of a new fragmented spectrum. In addition, when a new carrier is allocated, it is able to consider providing two or more kinds of services within a corresponding band. In the 5G service scenario, there exists a demand for servicing heterogeneous services in a manner of separating them freely within a single carrier. This becomes a key point to have a degree of freedom of service capacity in viewpoint of a service provider.

Figure 9:
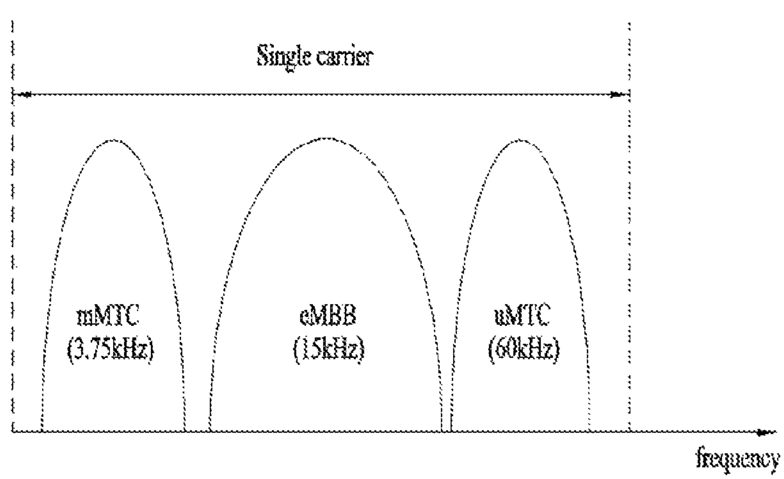
FIG. 9 is a diagram diagrammatizing the concept of providing mMTC (massive MTC), eMBB (enhanced mobile broadband), and uMTC (ultra-reliable and low latency MTC) services, which are the major 5G services, on a single carrier.

FIG. 9 is a diagram diagrammatizing the concept of providing mMTC (massive MTC), eMBB (enhanced mobile broadband), and uMTC (ultra-reliable and low latency MTC) services, which are the major 5G services, on a single carrier.

Referring to FIG. 9, multiple services (heterogeneous services included) within a single carrier can be provided. Since each service has different requirements, it is necessary to have a different subcarrier size. For example, in FIG. 9, the widest band in FIG. 9 is assigned for a very reliable MTC service and the narrowest band is assigned for a massive MTC service intermittently transmitted. In this case, since a different subcarrier size is provided per service band, orthogonality is broken so as to cause interference. And, a new waveform is necessary to appropriately control the interference amount.

In order to provide various services within a single carrier, a new waveform for controlling OOBE is required. In case of the UF-OFDM and the FCP-OFDM having the transceiving end structures in FIG. 2 and FIG. 3, if bands in different subcarrier sizes are multiplexed within in-band, performance is degraded due to interference on a receiving side.

To solve such a problem, the present invention proposes a transceiving device that multiplexes two or more bands having subcarrier sizes within a single carrier.

Figure 10:
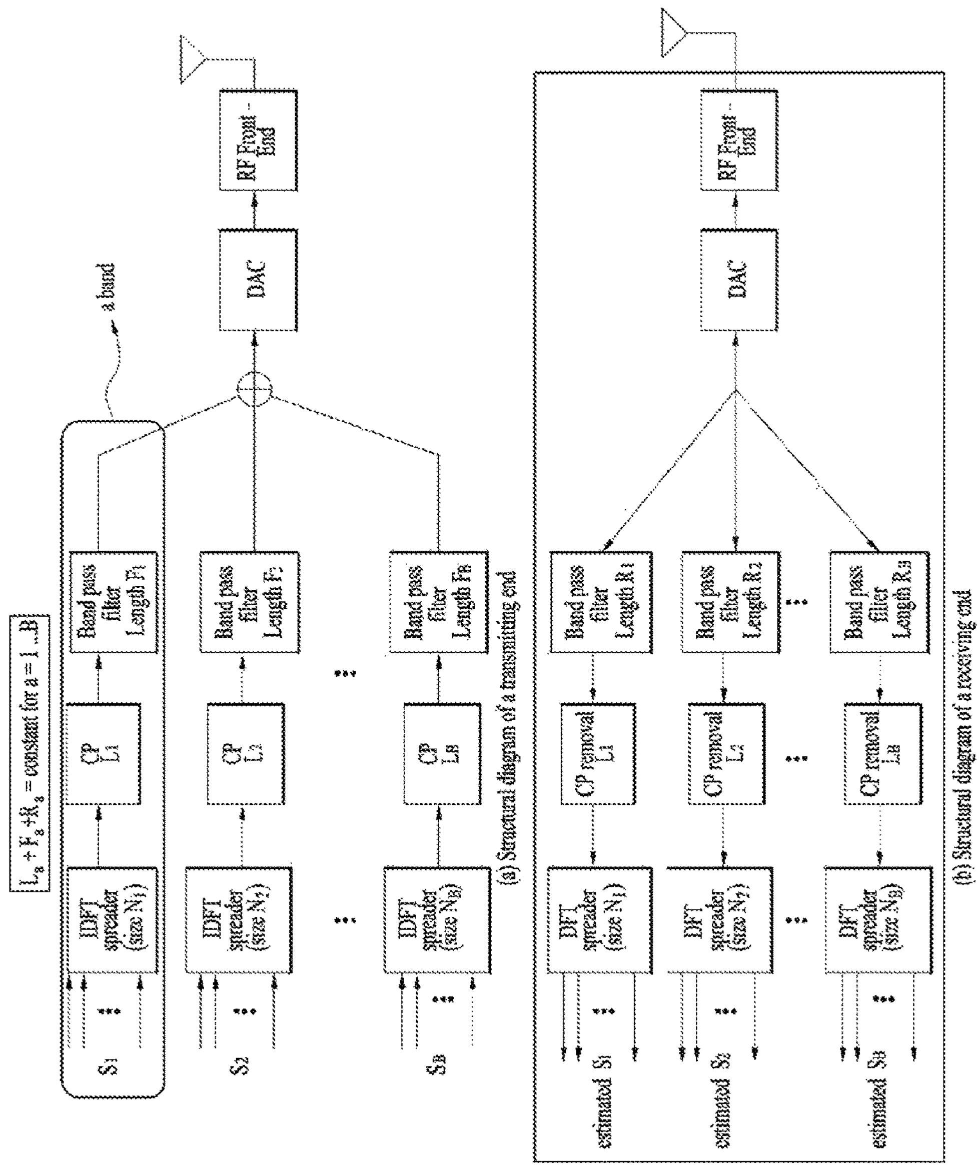
FIG. 10 is a diagram showing a transceiving device for in-band multiplexing.

Embodiment 1: FCP-OFDM Transceiving Device for In-Band Multiplexing Operating Two or More Bands Having Different Subcarrier Sizes FIG. 10 is a diagram showing a transceiving device for in-band multiplexing.

A transceiving device for in-band multiplexing may be included in a user equipment or a base station. FIG. 10 shows a receiving device that discriminates an inter-band signal through filtering after passing through an ADC (analog to digital convertor) in a receiving end. As shown in FIG. 10, a filter for filtering off a signal sent on a corresponding band is used. Thereafter, a signal of the corresponding band is received using DFT.

An FCP-OFDM transceiving device for in-band multiplexing can separate a signal of each band from signals of other bands by performing a filtering of a band unit in a receiving end. FIG. 10 is a diagram on the assumption of total B bands, and one band of a transmitting end can be multiplexed by several user equipments. And, an FFT size per band may have a different size. A filter length (e.g., $F_1$) of a specific band in a transmitting end may be determined according to a property of a user equipment multiplexed on the specific band. The transmitting end can perform a filtering through a band pass filter having a different length per service. And, the transmitting end can allocates a corresponding subband per service (e.g., mMTC (massive MTC), eMBB (enhanced mobile broadband), and uMTC (ultra-reliable and low latency MTC)). For example, a filter length for an mMTC service can be set to $F_1$, a filter length for an eMBB service can be set to $F_2$, and a filter length for a uMTC service can be set to $F_B$.

Figure 11:
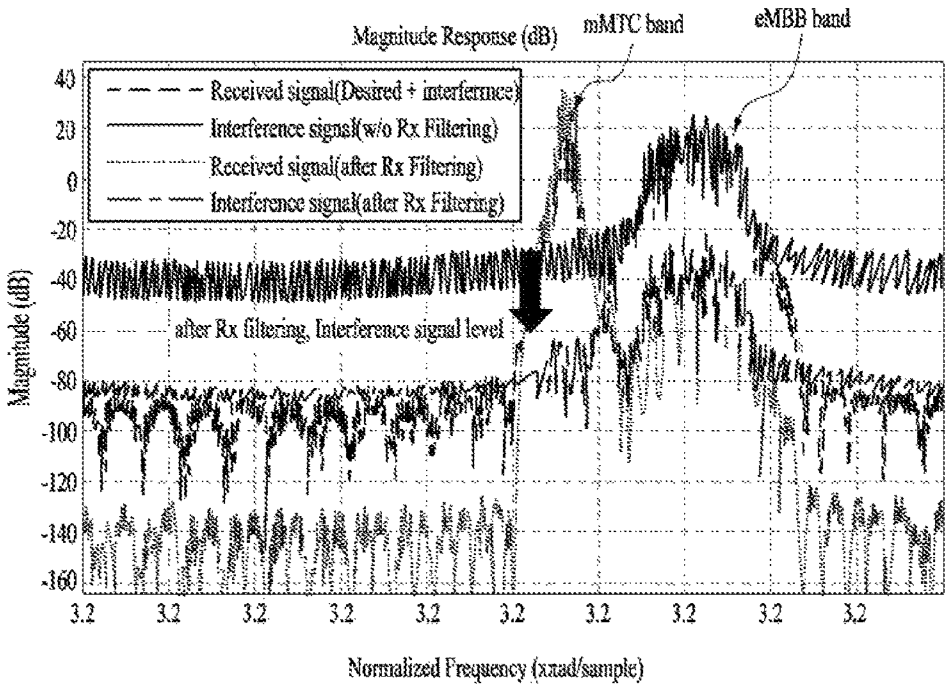
FIG. 11 is a diagram showing an interference signal level after reception filtering in a receiving end.

FIG. 11 is a diagram showing an interference signal level after reception filtering in a receiving end.

FIG. 11 shows one example for an interference signal on receiving two bands having different subband sizes. Here is a scenario of servicing a band in size of 6 RBs with a single subcarrier size of 3.75 kHz for an mMTC service and another band in size of 6 RBs with a single subcarrier size of 15 kHz for an eMBB service. In this case, since the sizes of the subcarriers used on the two bands are 15 kHz and 3.75 kHz, respectively, it is apparent that the size difference breaks mutual orthogonality so as to generate interference. In case of receiving a signal of mMTC band, as shown in FIG. 11, it can be observed that a large interference signal from an eMBB bad is incoming. On the other hand, by applying a reception filtering on reception, it is able to confirm an effect of reducing a signal power of interference incoming from the eMBB band by about 40 dB or more.

Embodiment 2: Signaling Scheme of Informing Transmitting End of Zero Padding Length in Consideration of Receiving End Filtering for In-Band Multiplexing Embodiment 2 proposes a signaling notified to a transmitting side by a receiving side to apply the device invented in the Embodiment 1 to a system.

If a receiving side performs a receiving end filtering, inter-symbol interference is generated from a receiving end filter so as to bring reception performance degradation. Moreover, since a per-band size may vary dynamically according to a required service capacity, an effective control for eliminating inter-symbol interference is required.

Figure 12:
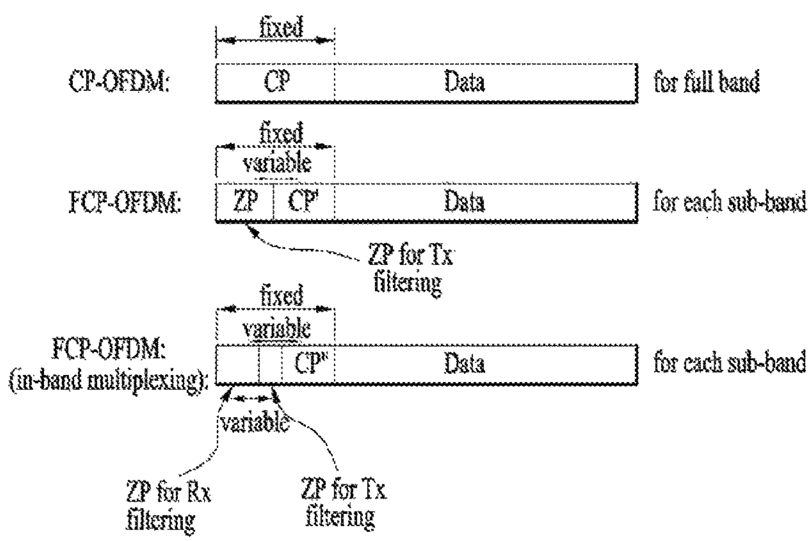
FIG. 12 is a diagram comparing transmission symbol structures of CP-OFDM, FCP-OFDM and FCP-OFDM (for in-band multiplexing) schemes.

FIG. 12 is a diagram comparing transmission symbol structures of CP-OFDM, FCP-OFDM and FCP-OFDM (for in-band multiplexing) schemes.

A case of an FCP-OFDM symbol structure is a scheme of controlling OOBE by subband unit by taking a zero padding (ZP) of a transmitting end while maintaining a total overhead equal to a CP of CP-OFDM. As described above, in order to support two or more bands having different subcarriers, it is apparent that an additional receiving end filtering is necessary. Hence, in order to eliminate inter-symbol interference due to a filter, it is necessary to additionally consider a receiving end filtering length.

To maintain N-point FFT without inter-symbol interference, ZPs should be set to meet the condition of $ZP\_Rx+ZP\_Tx-2 \le CP$ length. Here, ZP_Rx means the sample number of ZP for a first attached receiving end of a symbol and ZP_Tx means the sample number of ZP for a second attached transmitting end of symbol.

Hence, on the assumption that a transmitting end is aware of a per-band overhead, the following two informations need to be signaled from a receiving side. Namely, the receiving side needs to signal the following two informations to the transmitting side [(1) Length of ZP_RX of a corresponding band and (2) Length of ZP_TX of a corresponding band].

FIG. 12 shows a structure of 1 symbol. In case of FCP-OFDM (for in-band multiplexing), ZP for a receiving end is inserted in a symbol start part, ZP for a transmitting end is inserted, ZP for a transmitting end is inserted, and a CP is then inserted, in order. In case of FCP-OFDM (for in-band multiplexing), signals are transceived using such a symbol structure.

Table 1 in the following shows exemplary values for performing an in-band multiplexing on total 2 bands including a first band having a subcarrier size of 3.75 kHz and a second band having a subcarrier size of 15 kHz.

TABLE 1

| | mMTC band | eMBB band |
|---|---|---|
| Subcarrier size | 3.75 kHz | 15 kHz |
| Sampling frequency | 7.68 MHz | |
| Time per sample | 1/7.68 (us) | |
| FFT size | 2048 | 512 |
| Total overhead (CP + ZP_Rx + ZP_Tx) | 144 samples | 36 samples |
| Case 1: BW for band | 180 kHz | 3.6 MHz |
| ZP_Rx(= Rx filter length − 1) | 32 samples | 8 samples |
| ZP_Tx(= Tx filter length − 1) | 36 samples | 8 samples |
| Case 2: BW for band | 1.08 MHz | 2.7 MHz |
| ZP_Rx(= Rx filter length − 1) | 24 samples | 10 samples |
| ZP_Tx(= Tx filter length − 1) | 16 samples | 8 samples |

In case of providing an mMTC service and an eMBB service to a specific user equipment by in-band multiplexing on 2 bands like Table 1, a size of a corresponding band (BW for band) is determined per service, whereby a length of ZP_Rx of the corresponding band and a length of ZP_Tx of the corresponding band can be determined. Moreover, as a used band varies like the case 1 and the case 2 in Table 1, it is necessary to reset a new filter length. And, a corresponding period may be determined by a system.

Using a numerology like Table 1, different bands can be supported on a single carrier.

In case of a signaling method, a base station can signal a length of ZP_Rx and a length of ZP_Tx on each corresponding band for multiplexed bands to a user equipment.

In particular, in case of uplink, a base station can UE-specifically signal a length of ZP_Rx of a corresponding band used by a user equipment and a transmitting end ZP_Tx length used by the user equipment to the user equipment through a physical layer (e.g., EPDCCH (Enhanced Physical Downlink Control CHannel), PDCCH (Physical Downlink Control CHannel, PDSCH (Physical Downlink Shared CHannel), etc.) signal or a higher layer signal.

In case of downlink, a length of ZP_Tx of a corresponding band used UE-specifically by a base station and a length of ZP_Rx to be used by a user equipment can be signaled to the user equipment through a physical layer (e.g., EPDCCH (Enhanced Physical Downlink Control CHannel), PDCCH (Physical Downlink Control CHannel, PDSCH (Physical Downlink Shared CHannel), etc.) signal or a higher layer signal.

In case of uplink/downlink, a base station can UE-specifically broadcast a length of ZP_Rx of a corresponding band and a transmitting end ZP_Tx length used by a user equipment to user equipments through system information (e.g., PBCH).

Thus, a base station can inform a user equipment of a length of ZP_Rx indicating the sample number of ZP for a receiving side on a corresponding band and a length of ZP_Tx indicating the ZP sample number for a transmitting side.

Since examples of the above-described proposed scheme can be included as one of the implementing methods of the present invention, it is apparent that they can be regarded as a sort of proposed schemes. Moreover, although the above-described proposed schemes may be implemented independently, they may be implemented in a combined (or merged) form of some of the proposed schemes. A rule may be defined in a manner that information indicating whether to apply the proposed methods (or, information on rules of the proposed methods) is notified to a user equipment by a base station through a predefined signal (e.g., physical layer signal, higher layer signal, etc.).

Table 2 in the following shows one example of CP and ZP length according to RB size. Table 2 exemplarily shows a size of ZP_Tx (or ZP_T) and a sum of lengths of ZP_Rx (or ZP_R) and ZP_T with reference to 1 RB in case of the FCP OFDM (for in-band multiplexing) shown in FIG. 12. A length of ZP_R can be inferred from Table 2.

TABLE 2

| 1 RB reference | Total | ZP_R + ZP_T | ZP_T |
|---|---|---|---|
| Normal flexible prefix | 144 | 72, 60, . . . | 36, 18, . . . |
| Extended flexible prefix | 512 | 256, 128, . . . | 128, 84, . . . |

As described above, according to an embodiment of the present invention, when different bands configured in different subcarrier sizes are multiplexed on a single carrier, a size of an interference signal due to orthogonality absence can be effectively eliminated through FCP-OFDM supportive of in-band multiplexing.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

A method of performing in-band multiplexing using FCP-OFDM scheme and apparatus therefor is industrially applicable to various kinds of wireless communication systems.

What is claimed is:

1. A method for in-band multiplexing using an FCP-OFDM (Filtered Cyclic Prefix Orthogonal Frequency Division Multiplexing) scheme by a user equipment (UE), the method comprising:

receiving, information regarding a first zero padding (ZP) length for the UE and a second ZP length for a base station (BS), from the BS, the first ZP length and the second ZP length being configured for a first band;

applying the first ZP length or the second ZP length to a first signal to be transmitted on the first band; and transmitting the first signal on the first band to the BS.

2. The method of claim 1, wherein the second ZP length corresponds to a length derived by subtracting 1 from a filter length of the BS.

3. The method of claim 1, wherein the first ZP length corresponds to a length derived by subtracting 1 from a filter length of the UE.

4. The method of claim 1, further comprising:

receiving, information regarding a third ZP length for the UE and a fourth ZP length for the BS, from the BS, the third ZP length and the fourth ZP length being configured for a second band;

applying the third ZP length and the fourth ZP length to a second signal to be transmitted on the second band; and transmitting the second signal on a second band to the BS.

5. The method of claim 4, wherein the first band and the second band have different subcarrier sizes, respectively.

6. A method for in band multiplexing using an FCP-OFDM (Filtered Cyclic Prefix Orthogonal Frequency Division Multiplexing) scheme by a user equipment (UE), the method comprising:

receiving, information regarding a first zero padding (ZP) length for a base station (BS) and a second ZP length for the UE from the BS, the first ZP length and the second ZP length being configured for a first band; and receiving a first signal of a first service on a first band from the BS;

performing filtering the first signal of the first service on the first band based on the information regarding the first ZP length and the second ZP length.

7. The method of claim 6, wherein the second ZP length corresponds to a length derived by subtracting 1 from a filter length of the UE.

8. The method of claim 6, wherein the first ZP length corresponds to a length derived by subtracting 1 from a filter length of the BS.

9. The method of claim 6, further comprising:

receiving, information regarding a third ZP length for the BS and a fourth ZP length for the UE, from the BS, the third ZP length and the fourth ZP length configured for a second band;

receiving a second signal of a second service on a second band from the BS;

filtering the second signal of the second service on the second band based on the information on the third ZP and the fourth ZP length.

10. The method of claim 9, wherein the first hand of the first service and the second band of the second service have different subcarrier sizes, respectively.

11. A user equipment (UE) for an in-band multiplexing using an FCP-OFDM (Filtered Cyclic Prefix Orthogonal Frequency Division Multiplexing) scheme, the UE comprising:

a receiver;

a transmitter; and a processor, operatively coupled to the receiver and the transmitter, wherein the processor is configured to:

control the receiver to receive, information regarding a first zero padding (ZP) length for the UE and a second ZP length for a BS, from the UE), the first ZP length and the second ZP length configured for a first band;

apply the first ZP length or the second ZP length to a first, signal to be transmitted on the first band; and control the transmitter to transmit the first signal on the first band to the BS.

12. A user equipment (UE) for in-band multiplexing using an FCP-OFDM (Filtered Cyclic Prefix Orthogonal Frequency Division Multiplexing) scheme, the UE comprising:

a receiver; and a processor, operatively coupled to the receiver, wherein the processor is configured to:

control the receiver to receive, information regarding a first zero padding (ZP) length for a base station (BS) and a second ZP length for the UE, from a BS, the first ZP length and the second ZP length configured for a first band; and control the receiver to receive a first signal of a first service on a first band from the BS, and filter the first signal of the first service on the first band based on the information regarding the first ZP length and the second ZP length.

13. The method of claim 4, wherein the first signal corresponds to a signal of a first service provided on the first band and the second signal corresponds to a signal of a second service provided on the second band.

14. The method of claim 9, wherein the first signal corresponds to a signal of a first service provided on the first band and the second signal corresponds to a signal of a second service provided on the second band.

15. The method of claim 4, wherein the first service is a massive Machine Type Communications (mMTC) service and the second service is an Enhanced mobile broadband (eMBB) service.

16. The method of claim 9, wherein the first service is a massive Machine Type Communications (mMTC) service and the second service is an Enhanced mobile broadband (eMBB) service.

17. The method of claim 4, wherein the first band and the second band are included in a single carrier.

18. The method of claim 9, wherein the first band and the second band are included in a single carrier.

* * * * *